United States Patent
Froh et al.

(10) Patent No.: US 12,467,474 B2
(45) Date of Patent: Nov. 11, 2025

(54) COOLING FAN AND COOLING FAN MODULE

(71) Applicant: Brose Fahrzeugteile SE & Co. Kommanditgesellschaft, Wuerzburg, Wuerzburg (DE)

(72) Inventors: Christian Froh, Cuxhaven (DE); Bernd Maurer, Bad Zwischenahn (DE); Thomas Dreesen, Oldenburg (DE)

(73) Assignee: Brose Fahrzeugteile SE & Co. Kommanditgesellschaft, Wuerzburg, Wuerzburg (DE)

( * ) Notice: Subject to any disclaimer, the term of this patent is extended or adjusted under 35 U.S.C. 154(b) by 0 days.

(21) Appl. No.: 18/796,733

(22) Filed: Aug. 7, 2024

(65) Prior Publication Data
US 2024/0392805 A1 Nov. 28, 2024

Related U.S. Application Data

(60) Division of application No. 17/844,926, filed on Jun. 21, 2022, now Pat. No. 12,247,579, which is a
(Continued)

(30) Foreign Application Priority Data

Dec. 19, 2019 (DE) .................. 10 2019 220 232.2

(51) Int. Cl.
| | | |
|---|---|---|
| F04D 29/52 | (2006.01) | |
| F01P 5/04 | (2006.01) | |
| F01P 5/06 | (2006.01) | |
| F04D 19/00 | (2006.01) | |

(Continued)

(52) U.S. Cl.
CPC .............. *F04D 29/522* (2013.01); *F01P 5/06* (2013.01); *F04D 19/002* (2013.01); *F04D 25/06* (2013.01);
(Continued)

(58) Field of Classification Search
CPC ...... F04D 29/522; F04D 19/002; F04D 25/06; F04D 29/325; F04D 29/326; F04D 29/526; F04D 29/545; F04D 29/547; F01P 5/06
See application file for complete search history.

(56) References Cited

U.S. PATENT DOCUMENTS

| 5,297,931 A | 3/1994 | Yapp et al. |
| 5,489,186 A | 2/1996 | Yapp et al. |

(Continued)

FOREIGN PATENT DOCUMENTS

| CN | 109114014 A | 1/2019 |
| DE | 69228189 T2 | 6/1999 |

(Continued)

*Primary Examiner* — Peter J Bertheaud
(74) *Attorney, Agent, or Firm* — Laurence A. Greenberg; Werner H. Stemer; Ralph E. Locher

(57) ABSTRACT

A cooling fan has a fan shroud with a fan wheel recess surrounded by a shroud ring and a fan wheel rotatably mounted in the fan wheel recess for conveying the air flow along a conveying direction from a shroud upper side to a shroud underside. The fan wheel has a central hub cup with radially orientated blades and an outer ring connecting the blades at the blade tip ends. A circumferential ring gap is formed between the outer ring and the shroud ring. A rib structure in the ring gap reduces swirl in a gap flow orientated against the conveying direction. A shroud ring section of the shroud ring extends axially beyond the outer ring on the shroud underside. The shroud ring section is orientated parallel or at an angle of inclination and radially inwards relative to the conveying direction.

5 Claims, 8 Drawing Sheets

Related U.S. Application Data continuation of application No. PCT/EP2020/086221, filed on Dec. 15, 2020.

(51) Int. Cl.
 F04D 25/06 (2006.01)
 F04D 29/16 (2006.01)
 F04D 29/32 (2006.01)
 F04D 29/54 (2006.01)

(52) U.S. Cl.
 CPC ......... *F04D 29/325* (2013.01); *F04D 29/326* (2013.01); *F04D 29/526* (2013.01); *F04D 29/545* (2013.01); *F04D 29/547* (2013.01); *F01P 2005/046* (2013.01); *F04D 29/164* (2013.01)

(56) References Cited

U.S. PATENT DOCUMENTS

| | | |
|---|---|---|
| 7,762,769 B2 | 7/2010 | Stevens et al. |
| 10,605,256 B2 | 3/2020 | Tyner et al. |
| 2016/0305448 A1 | 10/2016 | Hong |
| 2018/0372113 A1 | 12/2018 | Tyner et al. |

FOREIGN PATENT DOCUMENTS

| | | |
|---|---|---|
| DE | 102008046508 A1 | 3/2010 |
| DE | 102014114162 A1 | 4/2015 |
| DE | 102018115000 A1 | 12/2018 |
| EP | 1862675 B1 | 9/2009 |
| WO | 9305275 A1 | 3/1993 |
| WO | 2006063825 A1 | 6/2006 |

COOLING FAN AND COOLING FAN MODULE

CROSS-REFERENCE TO RELATED APPLICATION

This application is a divisional of patent application Ser. No. 17/844,926, filed Jun. 21, 2022, which was a continuation, under 35 U.S.C. § 120, of International Patent Application PCT/EP2020/086221, filed Dec. 15, 2020; this application also claims the priority, under 35 U.S.C. § 119, of German Patent Application DE 10 2019 220 232.2, filed Dec. 19, 2019; the prior applications are herewith incorporated by reference in their entirety.

FIELD AND BACKGROUND OF THE INVENTION

The invention relates to a cooling fan, which is preferably electrically (electromotively) driven and which is particularly suited for a motor vehicle. The cooling fan comprises a fan shroud having a fan wheel recess and having a fan wheel comprising an outer ring (casing ring) which is rotatably arranged or positioned in the fan wheel recess. The invention further relates to a cooling fan module, in particular as a preassembled structural unit.

Modern internal combustion engines, in particular four-stroke engines in motor vehicles, are typically cooled by a coolant, generally a mixture of water, antifreeze and anti-corrosion agent being used therefor. The coolant is conveyed via hoses, pipes and/or channels through the internal combustion engine (cylinder head and engine block) and optionally through thermally stressed add-on parts of the internal combustion engine, for example an exhaust gas turbocharger, a generator or an exhaust gas recirculation cooler. In this case, the coolant absorbs the heat energy generated by the internal combustion engine and removes this heat energy from the afore-mentioned components. The heated coolant flows through a radiator which is attached to the front face of the motor vehicle and, according to the heat exchanger principle, an air flow absorbing the heat energy from the coolant and cooling it down thereby before the cooled coolant flows back again to the internal combustion engine, whereby the coolant circuit is closed.

Such a cooling system of an internal combustion engine, in particular of a motor vehicle, mainly dissipates the heat which is discharged onto the walls of combustion chambers and cylinders. Since excessive temperatures would damage the internal combustion engine, for example by removing a lubricating film, by burning inlet valves and/or outlet valves for the fuel-air mixture or the like, the internal combustion engine has to be actively cooled. In order to convey the air through the radiator, a cooling fan which is mechanically driven via a belt drive or which is electrically driven via an electric motor is provided in the direction of flow in front of the radiator (i.e., upstream) or behind the radiator (i.e., downstream).

Electrically or electromotively driven or drivable motor vehicles, such as for example electric or hybrid vehicles, generally comprise an electric motor as the electrical drive system by which one or both vehicle axles may be driven. For the purpose of supplying with electrical energy, the electric motor is typically coupled to a (high-voltage) battery in the vehicle interior as an electrical energy store.

Such electric motors as electrical drive machines generate relatively little waste heat during operation, whereby only a small cooling capacity is required in comparison with internal combustion engines. In the case of electrically driven or drivable motor vehicles, however, the additional problem occurs that the battery starts to degenerate at a high battery temperature, for example higher than 45° C. This means that, with such high temperatures, electrochemical reactions occur inside the battery which damage or completely destroy the battery.

For improving the electromobility in electric or hybrid vehicles, frequently so-called fast charging modes are desired in which the battery inside the vehicle is charged within the shortest possible time. Relatively high currents are present in the course of such fast charging, which as a result bring about an increase in the battery temperature during the charging process.

The charging of the battery generally takes place when the vehicle is at a standstill so that no air stream is present for the cooling. In order to improve the cooling capacity in the (fast) charging mode of the battery it is possible to generate a cooling air flow through a heat exchanger, for example by means of a cooling fan.

The following embodiments refer to a cooling fan having a fan shroud which comprises a fan wheel recess and having a fan wheel which is rotatably arranged in the fan wheel recess. The fan shroud generally has a shroud ring enclosing the fan wheel recess, wherein the fan wheel typically has an outer ring or casing ring which connects the blade tips of the fan wheel blades on the circumferential side. A clear spacing in the form of an annular gap or intermediate space, hereinafter also denoted as a ring gap, is formed between the outer ring of the fan wheel and the shroud ring of the fan shroud.

During the operation of such a cooling fan, a so-called backflow, leakage flow or gap flow is present due to the pressure difference between the rotating fan wheel and the fixed cooling fan shroud. The gap flow which is present is made up of a portion of the ambient air and a portion of the already conveyed air flow. The gap flow in this case denotes, in particular, the (air) flow which is formed in the gap region due to the negative pressure and which due to the rotation of the fan wheel is subject to swirl, i.e., has at least a certain angular momentum or a tangentially oriented flow component.

In certain applications, the gap flow which is subject to swirl leads to a flow separation on the blades of the fan wheel. As a result, the desired air conveyance is interrupted. In particular, the gap flow which is subject to swirl counteracts the main flow, whereby the flow behavior of the cooling fan module is negatively affected. The gap flow from the pressure side remote from the conveyed air flow toward the suction side of the cooling fan facing the conveyed air flow acts in the known manner to reduce the efficiency of the cooling fan and acts negatively on the cooling capacity of the cooling system. Moreover, this gap flow occasionally leads to a very high level of noise generation which reduces the comfort of the passengers during the operation of the motor vehicle.

The ring gap in this case typically has an approximately L-shaped gap geometry in cross section which substantially acts as a labyrinth seal or gap seal and thus reduces the gap flow in the axial direction. In order to reduce swirl, for example, an annular rib structure is arranged inside the gap geometry which rectifies the suctioned gap flow which is subject to swirl, which leads to a stabilization of the flow. As a result, a flow separation is avoided.

Such a rib structure is disclosed, for example, in U.S. Pat. No. 7,762,769 B2 and European Patent EP 1 862 675 B1. In this case the disclosed rib structure cooperates with a pocket or outlet bell of the shroud ring, wherein the rib structure is arranged between the walls of the pocket.

An "outlet bell" or a "(shroud ring) pocket" is to be understood to mean here and hereinafter, in particular, a region of the shroud ring which is bent back in an approximately U-shaped manner in the axial or conveying direction of the cooling fan, i.e., a shroud ring section in which the shroud ring end surface thereof is oriented substantially counter to the conveying direction. In other words, a cavity which is enclosed on three sides in the axial and radial direction and in which the rib structure is at least partially arranged is configured in the region of the pocket.

Such outlet bells or (shroud ring) pockets require a relatively large axial constructional space. Accordingly, such cooling fans are of large construction in the axial direction.

SUMMARY OF THE INVENTION

It is accordingly an object of the invention to provide a cooling fan which overcomes the above-mentioned disadvantages of the heretofore-known devices and methods of this general type and which provides for a particularly suitable cooling fan, which is compact in terms of constructional space in the axial direction, and in which a reliable reduction of a gap flow is made possible. It is a further object of the invention to specify a particularly suitable cooling fan module.

With the above and other objects in view there is provided, in accordance with the invention, a cooling fan, comprising:
  a fan shroud having a shroud upper side and a shroud underside, and being formed with a fan wheel recess which is surrounded by a shroud ring; and
  a fan wheel rotatably arranged in the fan wheel recess for conveying an air flow along a conveying direction from the shroud upper side to the shroud underside;
  the fan wheel having a central hub cup, a plurality of blades radially projecting from the hub cup, and an outer ring connecting the blades to one another at a blade tip end thereof;
  the outer ring and the shroud ring being disposed to form a circumferential ring gap therebetween;
  a rib structure disposed in the ring gap and configured to reduce swirl in a gap flow oriented against the conveying direction;
  the shroud ring having a shroud ring section extending axially on the shroud underside beyond the outer ring; and
  the shroud ring section being oriented parallel or at an angle of inclination and radially inwards relative to the conveying direction.

In other words, the objects of the invention are achieved according to the invention by the claimed cooling fan and the claimed cooling fan module. The advantages and specific embodiments set forth regarding the cooling fan are also able to be expediently transferred to the cooling fan module and vice-versa.

The cooling fan according to the invention is provided, in particular, for a motor vehicle and is suitable and configured therefor. The cooling fan comprises a fan shroud having a shroud upper side and having a shroud underside as well as having a fan wheel recess as a through-opening from the shroud upper side to the shroud underside. A fan wheel with an outer ring is inserted in the fan wheel recess, said outer ring connecting together the blade tips of blades which extend from a (central) hub or a hub cup in the radial direction. During the operation of the cooling fan, the fan wheel rotates and at the same time conveys an air flow (main air flow, conveying air flow) from the shroud upper side to the shroud underside. The shroud upper side is thus to be understood to mean, in particular, a suction side or inlet side, i.e., an inflow side, of the cooling fan. Accordingly, the shroud underside is to be understood to mean, in particular, a pressure side or outlet side, i.e., an outflow side or discharge side, of the cooling fan.

The outer ring is also denoted as the casing ring or as the outer band or casing band. An annular gap or intermediate space-hereinafter denoted as the ring gap-which surrounds the outer ring on the circumference is formed between the outer ring of the fan wheel and a shroud ring (shroud band) surrounding or defining the fan wheel recess of the fan shroud.

A rib structure is introduced into the ring gap in order to reduce swirl in a gap flow oriented counter to the conveying direction. The rib structure is a barrier structure or (air) guidance structure for the gap flow, and as such is effective during the operation of the cooling fan. The rib structure in this case is designed or embodied such that when a gap flow which is subject to swirl flows through the ring gap, this gap flow is at least partially conducted over the rib structure and as a result the gap flow is reduced in terms of swirl. In other words, the gap flow is reduced in terms of swirl when flowing through the ring gap.

According to the invention, the shroud ring extends on the shroud underside, i.e., the pressure side or outlet side, axially beyond the outer ring with a shroud ring section. The shroud ring section is thus the section or region of the shroud ring which protrudes axially over the outer ring on the shroud underside. The shroud ring section in this case is oriented parallel or at an angle of inclination radially inwards relative to the conveying direction. As a result, a particularly suitable cooling fan is implemented. In particular, a cooling fan of particularly flat construction regarding the axial dimensions is thus made possible.

"Axial" or an "axial direction" is understood to mean here and hereinafter, in particular, a direction parallel (coaxial) to the rotational axis of the fan wheel, i.e., perpendicular to the front faces of the cooling fan or the fan shroud. Accordingly, "radial" or a "radial direction" is understood to mean here and hereinafter, in particular, a direction oriented perpendicularly (transversely) to the rotational axis of the fan wheel along a radius of the fan wheel or the shroud ring. "Tangential" or a "tangential direction" is understood to mean here and hereinafter, in particular, a direction along the circumference of the fan wheel or the shroud ring (circumferential direction, azimuthal direction), i.e., a direction perpendicular to the axial direction and to the radial direction.

The cooling fan according to the invention is preferably designed as an axial fan. An axial fan is understood to mean here and hereinafter, in particular, a cooling fan which axially suctions and axially expels cool air. This means that the axial fan conveys outwardly (blows out) in the axial direction. The conveying direction, i.e., the direction of the air flow or volume flow generated by the rotation of the fan wheel, is thus oriented substantially parallel to the axial direction.

A "fan wheel" in the context of the present invention, in particular, is a rotationally symmetrical component which has a hub, in particular in the form of a hub cup, and a number of blades attached thereto. In the case of a fan wheel driven by an electric motor, the hub represents the connection to the electric motor, in particular via a shaft protruding therefrom, so that a torque generated thereby is transmitted to the fan wheel. The blades are provided and/or designed to generate an air volume flow as soon as the fan wheel is set in rotary motion.

A "hub cup" in the context of the present invention is, in particular, a central part of the fan wheel which in the manner of a conventional cup is made up of a bottom surface and a cylinder surface adjoining thereto. In particular, the blades are arranged, in particularly integrally formed, on this cylindrical outer wall. The hub cup is arranged in the center of the fan wheel and provides a connection with a drive, in particular with an electric motor, if it is a fan wheel driven by electric motor. In this case, the hub cup at least partially covers this drive.

A "blade" in the context of the present invention is a flat body which is oriented in the radial direction in a plane to which the rotational axis is perpendicular, and is curved in the manner of a sickle in this plane and/or is inclined relative to this plane. A blade in the context of the present invention is also understood to mean a vane (fan vane) or a rotor blade. The blade is arranged on the hub cup and provided, in particular designed, to generate an air volume flow as soon as the fan wheel is set in rotary motion.

In a suitable embodiment, the axially protruding shroud ring section is designed without pockets. In other words, the shroud ring has no (shroud ring) pocket or no outlet bell, i.e., no cavity enclosed on three sides. This means that the shroud ring section is oriented parallel or at an acute angle of inclination radially inwards relative to the conveying direction. An "acute angle of inclination" or an "acute angle" is to be understood to mean an angle less than or equal to 90°, i.e., an angular range of between 0° and 90°.

The embodiment is based on the recognition that a suitable geometric design of the ring gap or the shroud ring section enables a positive influence on the flow of the gap flow which is comparable with a pocket or outlet bell. The shroud ring section in this case is able to be produced in a particularly simple manner and preferably requires less axial constructional space than a pocket with the same effect.

In an advantageous development, an (imaginary) connecting line is inclined at an acute angle relative to the conveying direction from an outer ring end surface on the shroud underside, i.e., the front end surface of the outer ring which faces the shroud underside, to a shroud ring end surface of the shroud ring section. The connecting line in this case is oriented within an axial and radial cutting plane. The connecting line corresponds substantially to the gap opening between the outer ring and the shroud ring section through which the gap flow flows. Due to the angle which is as acute or as flat as possible, it is ensured that a relatively large entry surface is produced so that the gap flow is able to be reliably guided over the rib structure.

In a preferred embodiment, an axial spacing between the outer ring end surface and the shroud ring end surface is greater than or equal to a radial spacing between the outer ring end surface and the shroud ring end surface. The axial spacing in this case is understood to mean, in particular, an axial distance between the points of the end surfaces oriented the lowest in the conveying direction, i.e., those points which mostly face the shroud underside. The shroud ring section in this case is the region of the shroud ring which extends along the axial spacing, i.e., the region between the outer ring end surface and the shroud ring end surface. The radial spacing in this case is understood to mean, in particular, a radial distance between the radially outermost points of the outer ring end surface and the radially innermost points of the shroud ring end surface.

The acute angle between the conveying direction and the connecting line corresponds to the arctangent (arctan) of the ratio between the radial spacing and the axial spacing of the end surfaces. As the axial spacing is greater than or equal to the radial spacing or the radial spacing is less than or equal to the axial spacing, the acute angle between the conveying direction and the connecting line in this embodiment is always less than or equal to 45, i.e., in an angular range of between 0° and 45°. Preferably, the angle is dimensioned, for example, to be between 15° and 45°, preferably between 20° and 40°, in particular approximately 25°. As a result, a particularly suitable opening of the ring gap is produced.

In one conceivable embodiment, the outer ring has a radial lip which is aligned flush with the ring gap in the region of the shroud upper side in the radial direction. In other words, the radial lip is aligned with the gap opening on the shroud upper side. The radial lip protrudes radially over the outer periphery of the outer ring. The radial lip in this case overlaps the rib structure at least in some sections.

The shroud ring suitably has on the shroud upper side in the region of the gap opening a stepped offset oriented approximately radially, i.e., a radial intermediate region which connects two approximately axially oriented regions of the shroud ring. The radial lip in this case is arranged radially aligned with the stepped offset. The gap opening on the shroud upper side is thus formed between the radial lip and the stepped offset. As a result, the clear width between the outer ring and the shroud ring or between the radial lip and the stepped offset is reduced such that a particularly narrow gap opening is formed on the shroud upper side. By means of the radial lip, therefore, the ring gap is reduced in the direction of the shroud ring such that the radial lip and the shroud ring cooperate in the manner of a labyrinth seal. As a result, a particularly reliable reduction in swirl of the gap flow is ensured.

An additional or further aspect of the invention provides that the rib structure has a number of ribs which are arranged so as to be distributed on the circumferential side and which protrude radially into the ring gap at least in some sections. Preferably, the rib structure in this case is designed (configured) with locally periodic, i.e., regularly repeating, preferably similar ribs or rib elements, wherein further advantageously the ribs are arranged equidistant to one another in the circumferential direction. For example, the ribs are arranged at an angular offset of approximately 10° in the circumferential or tangential direction. In other words, the rib structure is formed, for example, by 36 ribs which are circumferentially arranged on the inner circumference of the shroud ring.

The ribs or rib elements in this case have, for example, a radially centrally tapering or eccentrically inclined rib inclination. The ribs have, for example, a triangular cross-sectional shape in a cutting plane oriented perpendicular to the axial direction. Alternatively, the ribs are configured, for example, as thin, substantially freestanding walls of the rib gap. In a further alternative embodiment, the rib structure is configured, for example, as a number of radial pockets with a ribbed effect.

In a preferred embodiment, the rib structure is integrally formed in one piece, i.e., in a single piece or monolithically, on an inner circumference of the shroud ring facing the outer ring. This means that both the gap geometry of the ring gap and the rib structure is dependent on the geometric design or embodiment of the shroud ring. As a result, the shroud ring has an advantageous functional integration such that a particularly simple and flexible adaptation of the ring gap or the rib structure to a respective application is possible. Expediently, in this case the shroud ring is configured as an injection-molded part.

In an expedient embodiment, the shroud ring section is oriented at an angle of inclination, in particular an acute angle of inclination, radially inwards relative to the conveying direction. In this case, the shroud ring section engages behind the outer ring in the radial direction at least in some sections. Preferably, in this case the radial lip of the outer ring is radially engaged behind by the shroud ring section. As a result, at least a certain radial offset is produced between the gap opening on the shroud upper side, which is configured in particular between the radial lip and the stepped offset of the shroud ring, and the gap opening on the shroud underside, which is configured in particular between the outer ring end surface and the shroud ring end surface. In other words, the gap opening on the shroud upper side is arranged offset radially outwardly and the gap opening on the shroud underside is arranged offset radially inwardly. As a result, the effect of the ring gap as a labyrinth seal is further improved.

In an advantageous embodiment, the shroud ring in the region of the ring gap has a circumferential contour which reduces the clear width between the shroud ring and the outer ring in the gap region at least in some sections. The contour in this case produces, in particular, a radial narrowing of the ring gap in the axial direction. The contour is configured, for example, as a radially inwardly oriented stepped offset and/or as a radially oriented radial lip or annular wall of the shroud ring. The contour in this case is preferably arranged so as to be closed over the circumference, i.e., along the entire inner circumference of the shroud ring, wherein additionally the rib structure, in particular the periodically arranged ribs, are provided. As a result, a particularly reliable and structurally simple reduction in the swirl of the gap flow is produced.

The cooling fan module according to the invention is preferably designed as a preassembled structural unit, which is composed of the above-described cooling fan and an electric motor which is preferably designed as an internal rotor and which is held by means of radially oriented struts in the fan wheel recess of the fan shroud. In this case, the rotor of the internal rotor is arranged fixedly in terms of rotation in the hub of the fan wheel, whilst the stator is held fixedly to the shroud by means of the struts.

"Cooling fan module" is understood to mean within the context of the invention, therefore, such a cooling fan which is driven (operated) electrically or by electric motor and is provided together with the electric motor as a preassembled component (module). The fan wheel is preferably held in this case by means of (radially oriented) struts which connect the fixed part of a drive, in particular the stator of an electric motor, to the cooler shroud, whilst the rotating part of the drive, in particular the rotor of the electric motor, is connected fixedly in terms of rotation to the central hub cup, to which the radially oriented blades of the fan wheel are attached, in particular are integrally formed in a single piece (in one piece, monolithically).

Other features which are considered as characteristic for the invention are set forth in the appended claims.

Although the invention is illustrated and described herein as embodied in a cooling fan and a cooling fan module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

Parts which correspond to one another and directional information are provided with the same reference numerals and symbols throughout the figures.

DETAILED DESCRIPTION OF THE INVENTION

Figure 1:
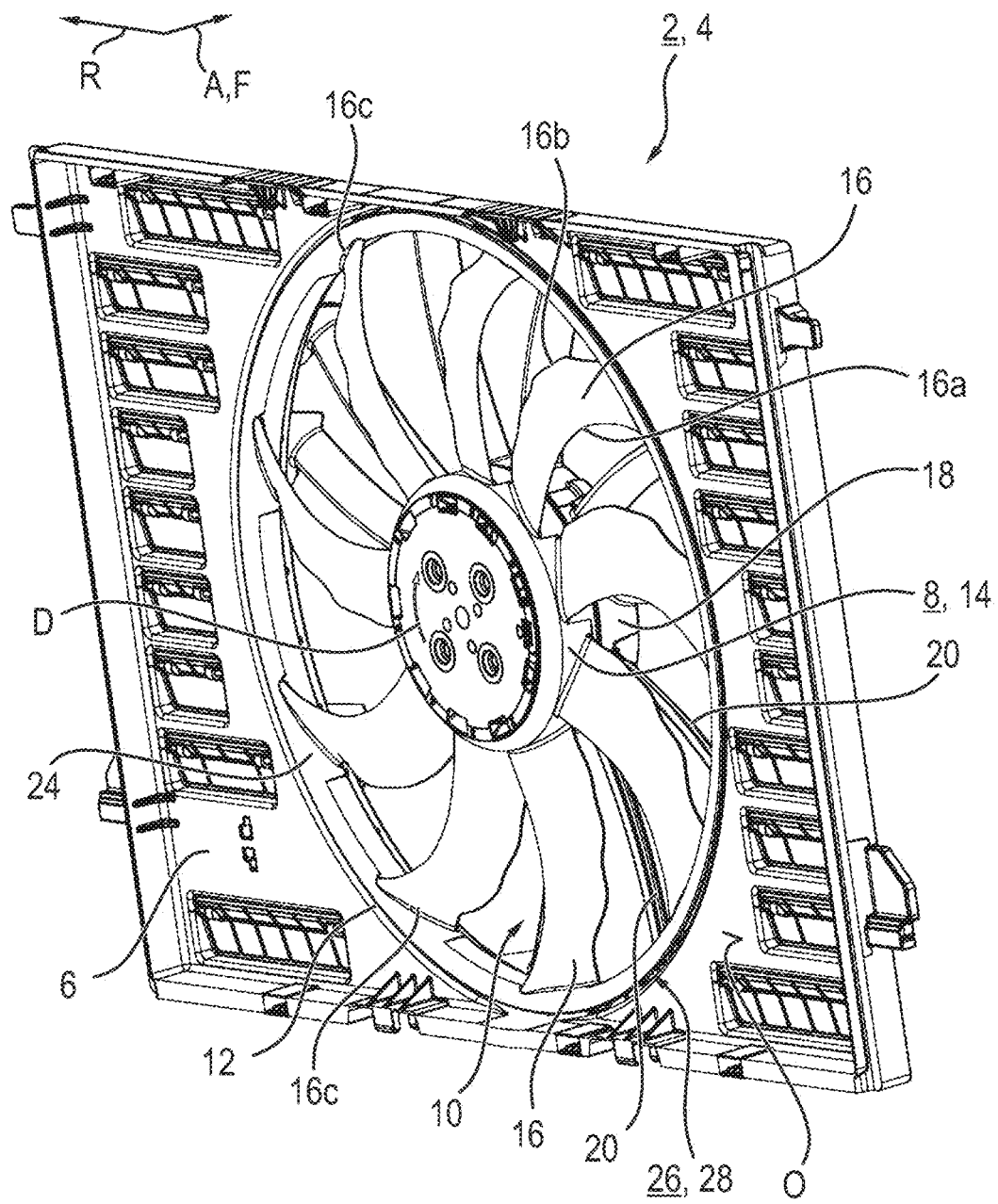
FIG. 1 shows in perspective a cooling fan module having a fan shroud and having a fan wheel which is rotatably arranged in a recess on the shroud side and which has a hub cup for receiving an electric motor and a number of blades, the blade tips thereof being connected to an outer ring.

Referring now to the figures of the drawing in detail and first, in particular, to FIG. 1 thereof, there is shown a perspective view of a cooling fan module 2 with a cooling fan 4. The cooling fan 4 has a fan shroud 6 and a fan wheel 8.

Figure 2:
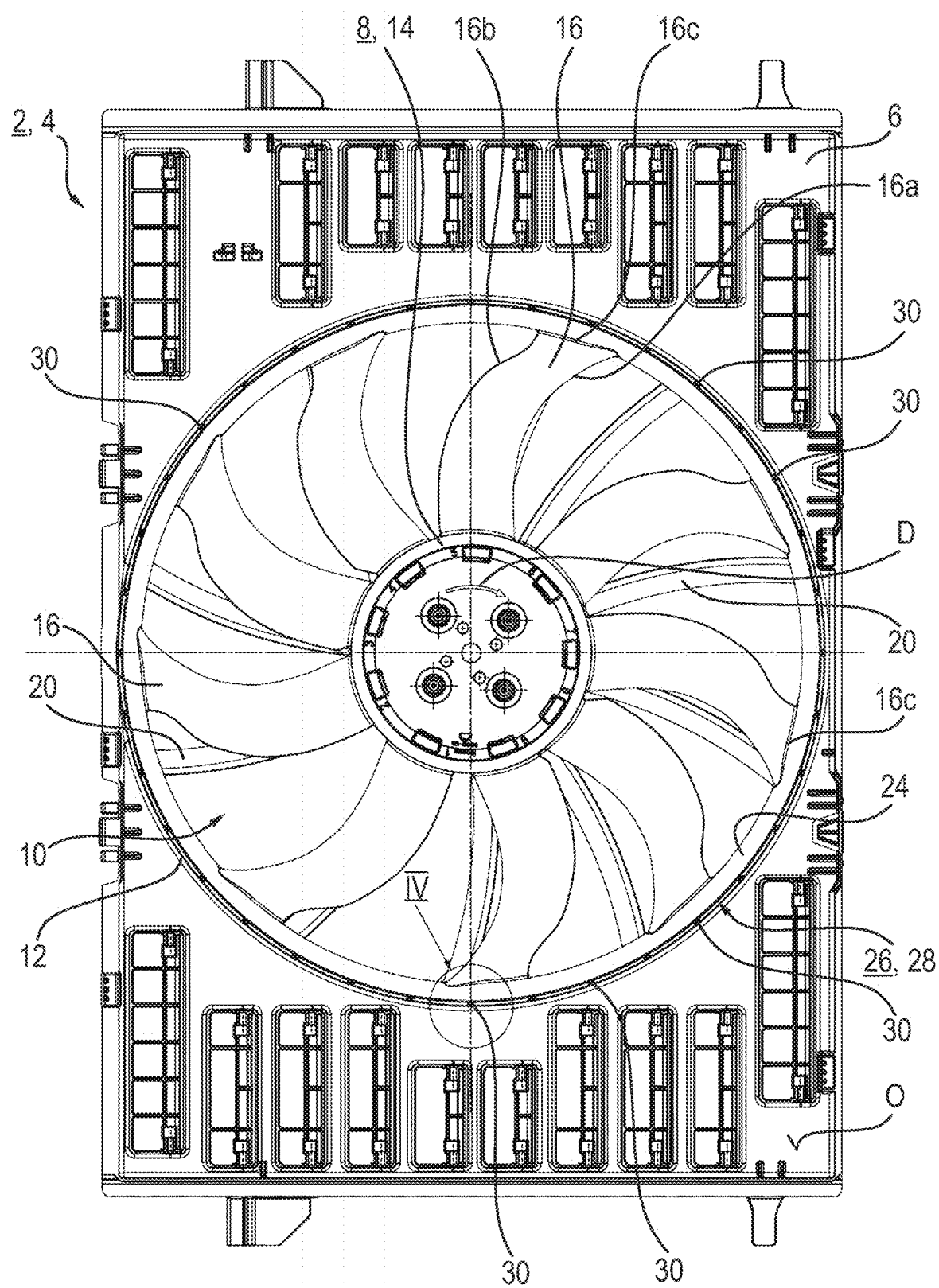
FIG. 2 is a plan view of the cooling fan module with a view of a shroud upper side.

A fan wheel recess 10, which is to be defined or is defined by a shroud ring 12, is configured in the fan shroud 6. The fan wheel 8 has a central hub cup 14, a number of blades 16 (fan vanes) which are oriented in the radial direction R being integrally formed on the outer face thereof. As is visible in particular in FIG. 2, the fan wheel 8 in this exemplary embodiment has nine blades 16. The blades 16 are provided with reference numerals merely by way of example in the figures.

Figure 3:
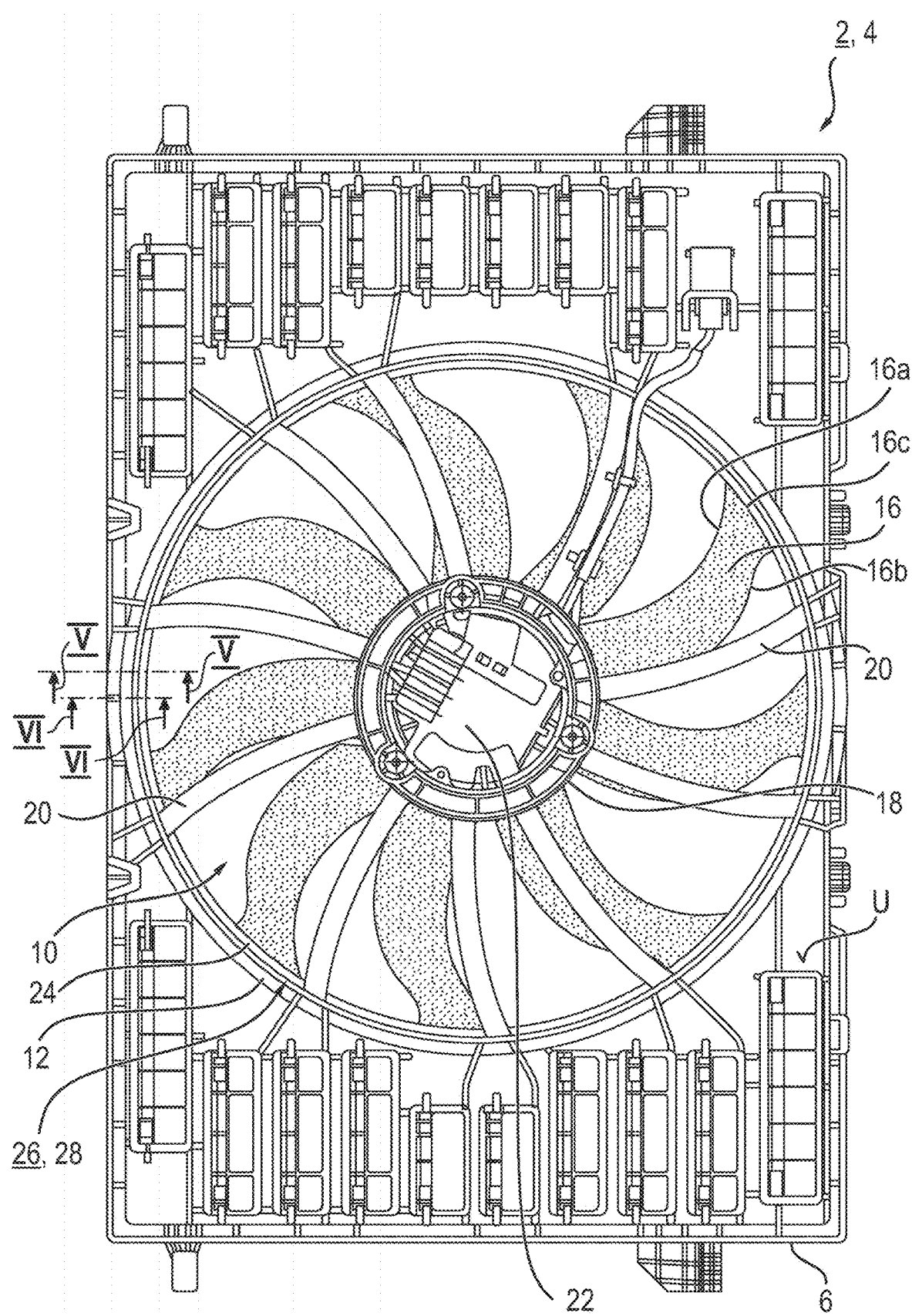
FIG. 3 is a plan view of the cooling fan module with a view of a shroud underside.

A motor holder or holder 18 coupled to the hub cup 14 is centrally arranged inside the fan wheel recess 10 and mechanically connected via struts 20 to the fan shroud 6. As is visible in particular in FIG. 3, the motor holder 18 in this case is held by means of ten struts 20 inside the fan wheel recess 10. The struts 20 are provided with reference numerals merely by way of example in the figures.

An electric motor, not shown in more detail, is held in the motor holder 18, the rotor thereof being surrounded by the stator. In other words, the electric motor is configured, in particular, as an internal rotor. A motor electronics system 22 (FIG. 3) is connected or connectable by means of cables guided on the struts 20 to an electrical energy supply, for example to a motor vehicle electrical system. The cooling fan module 2 is provided and designed to be installed in the motor vehicle on the front side. The cooling fan 4 in this case is designed, in particular, as an axial fan.

The struts 20 are arranged downstream of the fan wheel 8, viewed in the conveying direction F of the air flow generated by the cooling fan module 2 during the operation thereof, i.e., in the axial direction A. The conveying direction F in this case is oriented from a shroud upper side shown in FIG. 2 or shroud front face O to a shroud underside or shroud rear face U shown in FIG. 3. The stator is thus attached on the rear face of the fan wheel 8 directly or indirectly via the motor holder 18 to the struts 20 which in turn are connected to the fan shroud 6. The stator of the electric motor is thus rigidly connected to the fan shroud 6 and the rotor of the electric motor is held together with the fan wheel 8 in a rotatably movable manner in the fan wheel recess 10 of the fan shroud 6.

The fan wheel 6 which is arranged in the fan wheel recess 10 is rotatably driven by the electric motor in the rotational direction, symbolized by the arrow D in the figures, during the operation of the cooling fan module 2. The rotational direction D in this case is parallel to a tangential or circumferential direction of the fan wheel recess 10 or of the shroud ring 12. The blades 16 are designed in this rotational direction D to be concave on the front edges 16*a* thereof and substantially convex and preferably wave-shaped on the rear edges 16*b* thereof.

The blades 16 are connected together or mechanically coupled at the blade tips thereof 16*c* by means of a circumferential outer ring 24. The outer ring 24 serves, amongst other things, for the stabilization of the blades 16 during the rotary motion of the fan wheel 8. Moreover, the air flow is conducted and the aerodynamic properties of the fan wheel 6 are improved by means of the outer ring 24. A circumferential ring gap 26 is formed between the outer ring 24 (on the fan wheel side) and the shroud ring 12 (on the recess side).

The cooling fan module 2 is preferably provided as a (pre) assembled structural unit and thus has a cooling fan 4 formed by the fan shroud 6 and the fan wheel 8, as well as the electric motor, the rotor thereof being arranged fixedly in terms of rotation in the hub cup (in the fan hub) 14 of the fan wheel 8, and the stator thereof being held fixed to the shroud by means of the struts 20 which are oriented (radially) in the radial direction R in the fan wheel recess 10 of the fan shroud 6.

A rib structure 28 is introduced into the ring gap 26 in order to reduce swirl in a gap flow oriented counter to the conveying direction F. The rib structure 28 is effective as an (air) guidance structure in order to reduce swirl in the gap flow and is effective as such during the operation of the cooling fan 4. The ring gap 26 is thus designed as a rib gap.

The rib structure 28 has in the embodiment shown, for example, thirty six (36) ribs or rib elements 30 which are arranged so as to be distributed on the circumferential side and which at least in some sections protrude radially into the ring gap 26. The ribs 30 are equidistant in the circumferential direction, i.e., arranged at an angular offset of approximately 10° in the circumferential or tangential direction.

Figure 4:
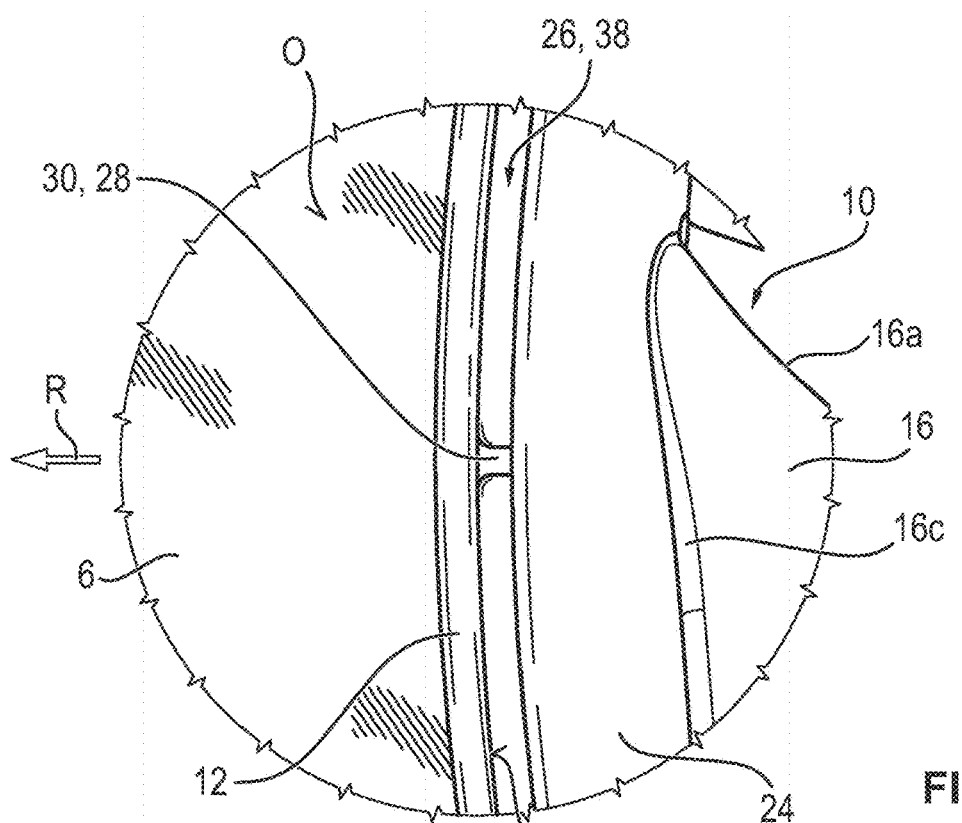
FIG. 4 is a plan view of a detail IV of a rib of a rib structure according to FIG. 2.

The ribs 30 or rib elements are integrally formed in one piece, i.e., in a single piece or monolithically, as substantially freestanding walls of the rib gap 26 on an inner circumference 32 of the shroud ring 12 facing the outer ring 24. As is visible for example in FIG. 4, the ribs 30 have a radially centrally tapering rib inclination. The ribs 30 of the rib structure 26 are provided with reference numerals merely by way of example in the figures.

Figure 5:
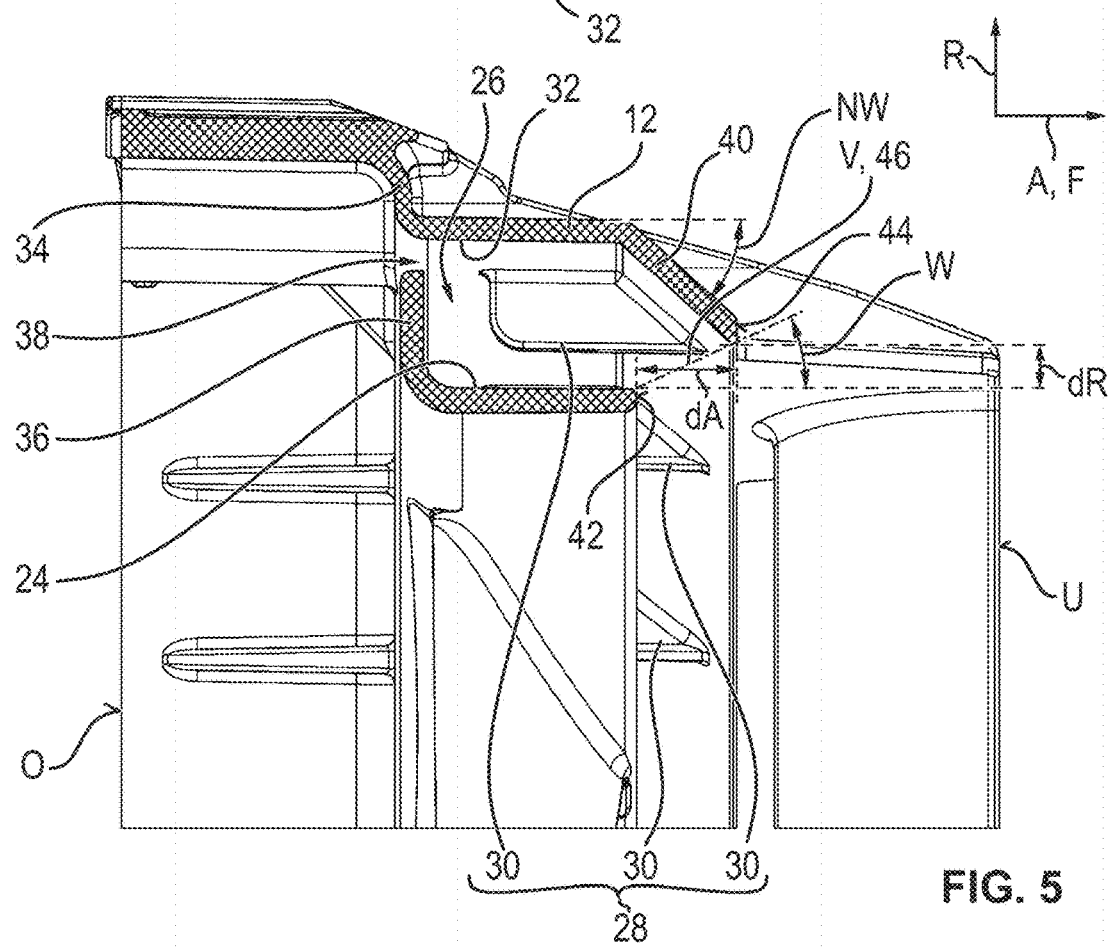
FIG. 5 is a sectional view taken along the cutting line V-V in FIG. 3, showing the region of a ring gap between the outer ring of the fan wheel and a shroud ring defining the recess on the shroud side.
Figure 6:
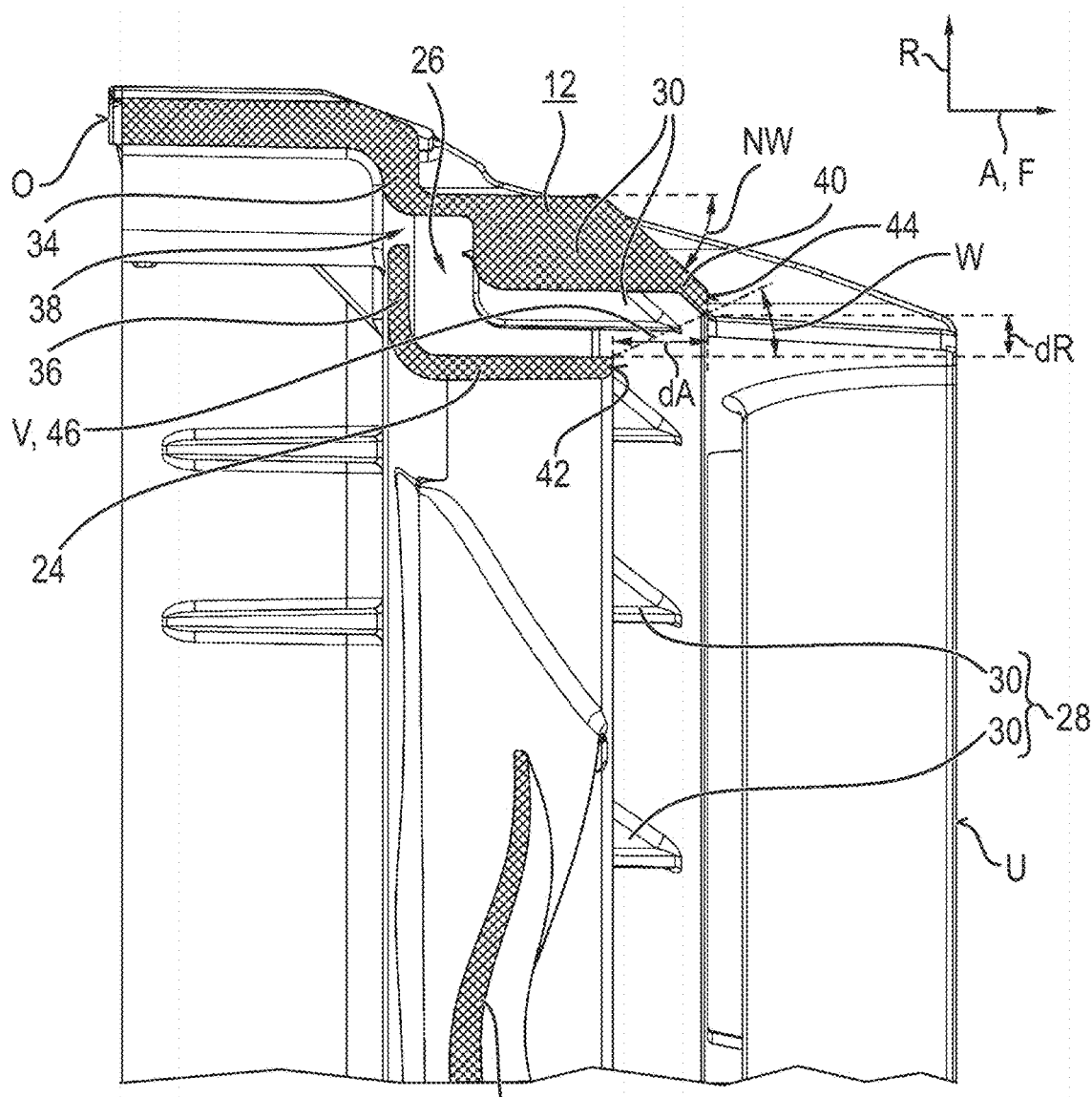
FIG. 6 is a sectional view taken along the cutting line VI-VI in FIG. 3, showing the region of a rib of the ring gap between the outer ring of the fan wheel and a shroud ring defining the recess on the shroud side.

The gap geometry, i.e., the geometric cross-sectional shape of the ring gap 26, is shown in more detail in FIGS. 5 and 6 by way of the sectional drawings. The sectional drawings in this case are oriented along the cutting lines V-V and VI-VI of FIG. 3, and in each case show a view of an axial radial cutting plane, i.e., a cutting plane which is spanned by the axial direction A and the radial direction R. The cutting line V-V runs in this case through a rib-free region of the ring gap 26, wherein the cutting line runs through a rib 30.

As is relatively clearly visible in the sectional views of FIG. 5 and FIG. 6, the shroud ring 12 has a radial stepped offset 34 on the shroud upper side O. The stepped offset 34 in this case is aligned in the radial direction R with a radial lip 36 of the outer ring 24 on the shroud upper side. The outer ring 24 has with the radial lip 36 an approximately L-shaped cross-sectional shape in the cutting planes shown, wherein the radial lip 36 extends as a horizontal L-shaped limb in the radial direction over the outer circumference of the outer ring 24. In this case, the radial lip 36 encompasses the rib structure 28 or the ribs 30 thereof in the radial direction R at least in some sections. A gap opening 38 of the ring gap 26 on the shroud upper side is provided between the stepped offset 34 of the shroud ring 12 and the radial lip 36 of the outer ring 24 as an outflow opening or outlet opening for the gap flow.

The shroud ring 12 extends in the region of the shroud underside U, i.e., the pressure side or outlet side of the fan wheel recess 10, with a shroud ring section or (shroud) ring extension 40 axially beyond the outer ring 24. In the exemplary embodiment shown in FIGS. 5 to 7, in this case the shroud ring section 40 is oriented at an angle of inclination NW radially inwards relative to the conveying direction. In the exemplary embodiment shown, the angle of inclination NW is approximately 45°. In other words, the shroud ring section 40 is bent or angled radially inwards. The shroud ring section 40 thus engages behind the radial lip 36 of the outer ring 24 at least in some sections in the radial direction R. The shroud ring section 40 is designed without pockets, i.e., without a shroud ring pocket or outlet bell.

Toward the shroud underside U the outer ring 24 has an outer ring end surface 42 on the axial front face, and the shroud ring section 40 has a shroud ring end surface 44 on the axial front face. A radial spacing dR and an axial spacing dA are present between the outer ring end surface 42 and the shroud ring end surface 44. In this case, the axial spacing dA denotes the axial distance between the approximately radially oriented end surfaces 42, 44, wherein the radial spacing dR denotes the radial distance between the radially outermost edge of the outer ring end surface 42 and the radially innermost edge of the shroud ring end surface 44.

In the exemplary embodiment of FIG. 5 and FIG. 6, the axial spacing dA is dimensioned to be larger than the radial spacing dR. In particular, the axial spacing dA is dimensioned to be approximately double the size of the radial spacing dR. A connecting line V between the end surfaces 42, 44, which is illustrated in the figures in dashed lines and which is shown by way of example from the radially outer lower edge of the outer ring end surface 42 to the radially inner lower edge of the shroud ring end surface 44, in this case has an acute angle W, which in the exemplary embodiment shown is dimensioned to be approximately 25°, relative to the conveying direction F. The connecting line V in this case substantially corresponds to a gap opening 46 which faces the shroud ring underside U and through which the gap flow is able to flow.

As is visible in particular in FIG. 6, the rib 30 is designed as an integrally formed (radial) material thickening of the shroud ring 12. The ring gap 26 has in the region of the ribs 30 an approximately L-shaped cross-sectional shape which acts as a labyrinth seal relative to the gap flow.

Various gap geometries and rib structures 28 are shown in schematic and highly simplified views in FIGS. 7 to 15.

With a specified angle, the term "approximately" denotes hereinafter, in particular, a specific angular range of the specified angular value, for example ±5°. For example, an angle of approximately 45° as (45±5)° is to be understood to mean an angular range of between 40° to 50°. Relative to specified lengths or ratios, for example relative to the radial spacing dR and the axial spacing dA, the term "approximately" is to be understood to mean a value range, the limits thereof, in particular, being able to be derived using the geometric relationships of the specified angles associated therewith. For example, the radial spacing dR and the axial spacing dA are dimensioned to be approximately the same size at an angle W of approximately 45°, in particular the ratio of the spacings (dR/dA) is between 0.839 (arctan (40°)) and 1.192 (arctan (45°)).

Figure 7:
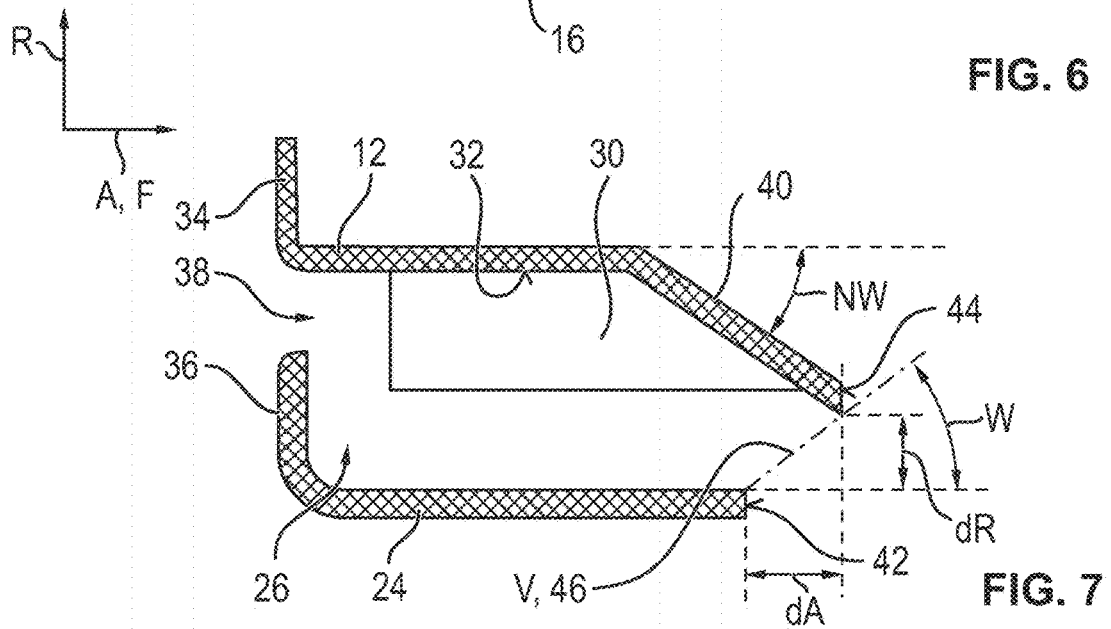
FIG. 7 is a schematic view of the ring gap according to FIG. 5 and FIG. 6.

The exemplary embodiment of FIG. 7 corresponds substantially to the above-described exemplary embodiment according to FIG. 5 and FIG. 6, wherein the angle of inclination NW and the angle W in each case are dimensioned to be approximately 35°.

Figure 8:
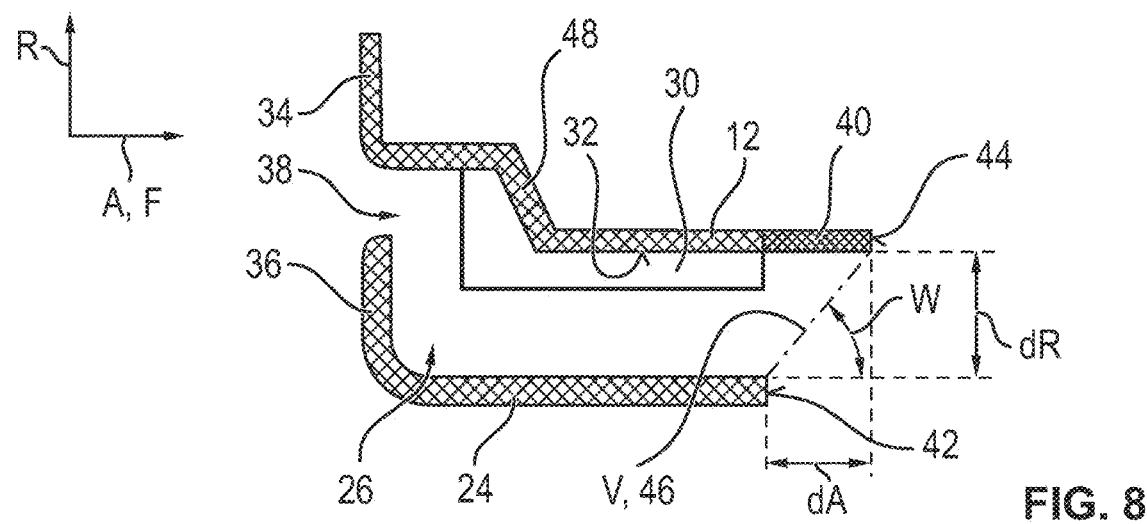
FIGS. 8 to 15 are schematic views showing different embodiments of the ring gap.

In the exemplary embodiment shown in FIG. 8, the shroud ring section or the ring extension 40 is oriented parallel to the conveying direction F or axial direction A. In other words, the angle of inclination NW is equal to 0°. The radial spacing or the radial distance dR in this case is dimensioned to be greater than the axial spacing or the axial distance dA, so that the angle W is greater than 45°, for example is approximately 50°.

The shroud ring 12 has in the region of the ring gap 26, i.e., in the region between the gap openings 38 and 46, a stepped contour 48. The contour 48, which is also denoted hereinafter as a stepped contour 48, is integrally formed circumferentially on the inner circumference 32 and brings about a radial narrowing of the ring gap 26. In the embodiment of FIG. 8, in this case the stepped contour 48 has a stepped offset which runs in an inclined or angled manner at an angle relative to the conveying direction. In other words, in the region of the stepped contour 48 the shroud ring 12 is positioned radially inwardly at an acute angle of less than 90°, not denoted further.

Figure 9:
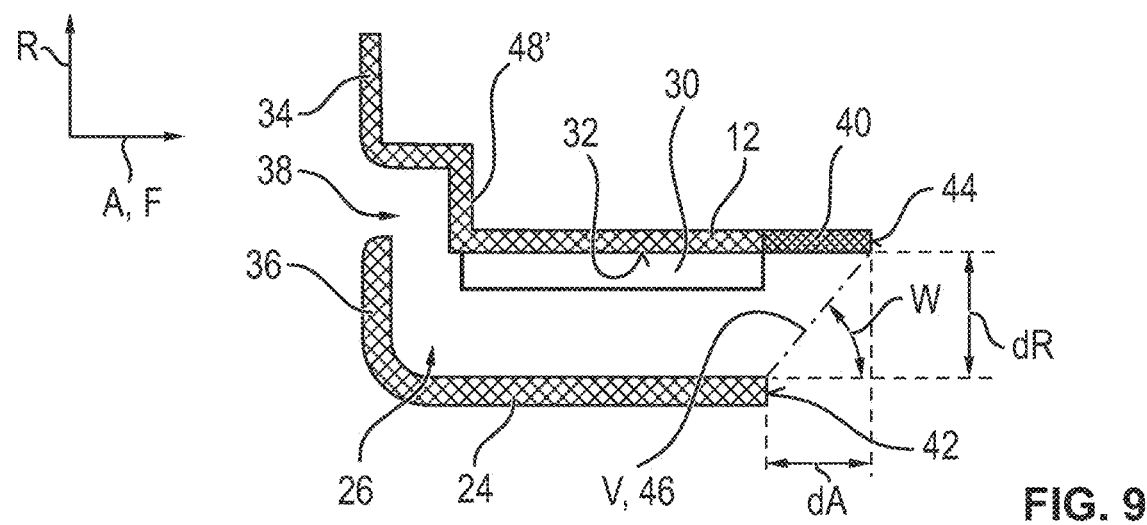

The exemplary embodiment of FIG. 9 shows a gap geometry which approximately corresponds to the embodiment of FIG. 8, wherein the stepped contour 48' has a radially oriented stepped offset which positions the shroud ring 12 radially inwardly in the region of the ring gap 26 at an angle of approximately 90°.

Figure 10:
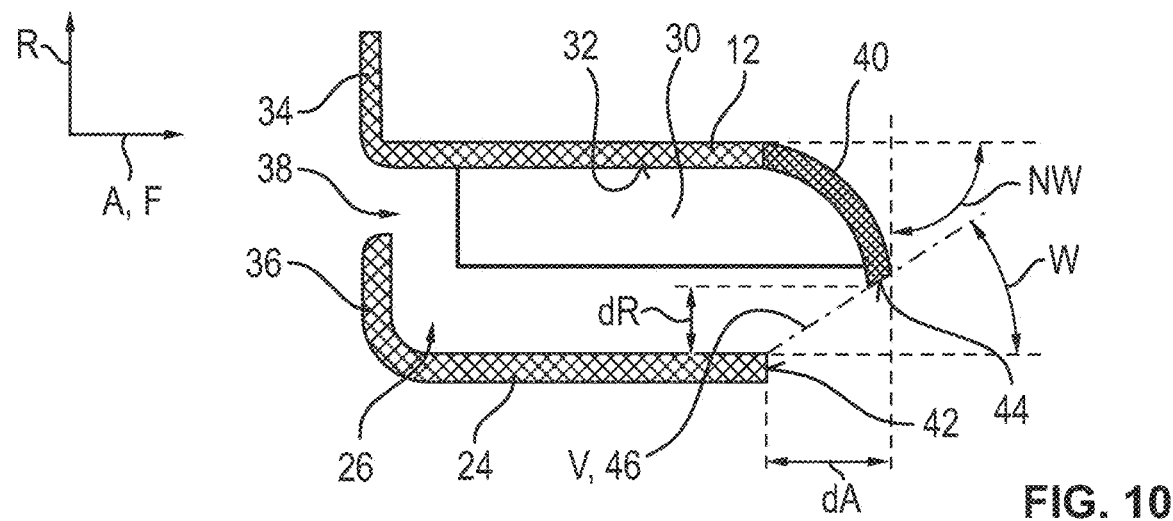

FIG. 10 shows an embodiment of the gap geometry in which the shroud ring section 40 is curved radially inwardly. The shroud ring section 40 in this case is bent radially inwardly at an angle of inclination of approximately 90°, such that the end surfaces 42, 44 are oriented approximately perpendicular to one another In other words, the shroud ring end surface 44 is oriented approximately axially. The axial distance dA in this case is dimensioned to be greater than the radial distance dR, wherein the angle W of the connecting line V is approximately 35°.

Figure 11:
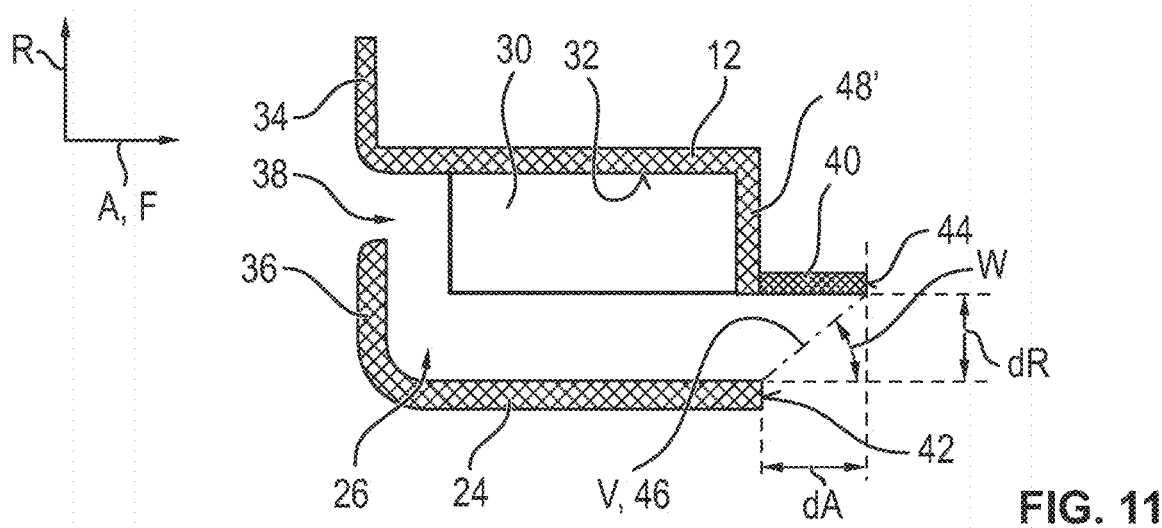

FIG. 11 shows a gap geometry with a shroud ring section 40 oriented parallel to the conveying direction F and a stepped contour 48' with a radial stepped offset. In contrast to the exemplary embodiment of FIG. 9, the stepped contour 48' is not arranged in the region of the gap opening 38 but in the region of the axially opposing gap opening 46. In particular, the stepped offset of the stepped contour 48' is approximately arranged at the axial height of the outer ring end surface 42. The ribs 30 extend in this case from the stepped offset counter to the conveying direction F. The axial distance dA and the radial distance dR are approximately equally dimensioned so that the angle W of the connecting line V is approximately 45°.

Figure 12:
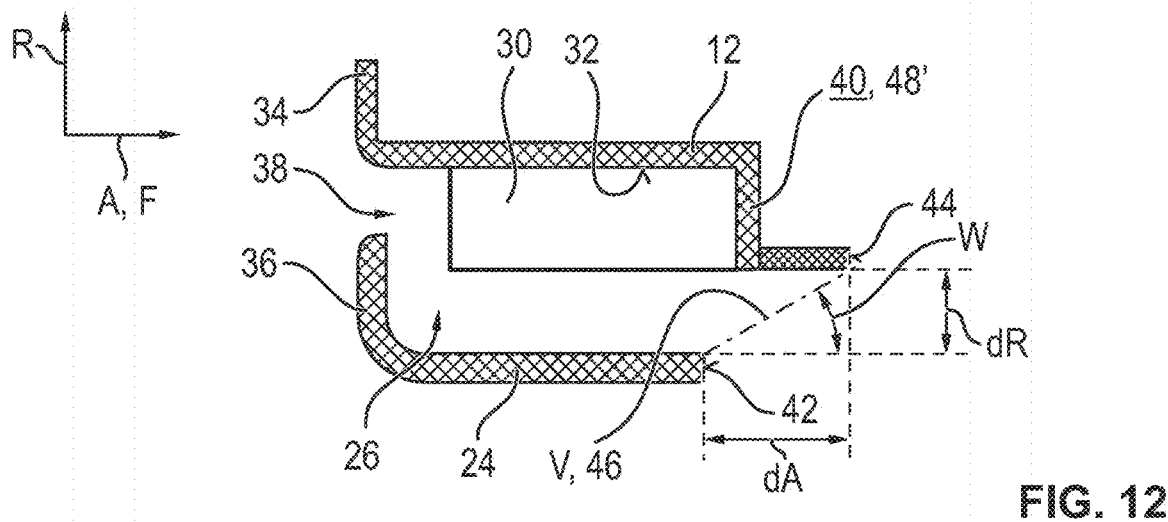

FIG. 12 shows an embodiment in which the stepped contour 48 is arranged in the region of the axially protruding shroud ring section 40, i.e., in the conveying direction F axially below the outer ring end surface 42. The ribs 30 extend in this case from the stepped offset counter to the conveying direction F. In other words, the ribs 30 extend at least partially over the shroud ring section 40. The axially oriented region of the shroud ring section 40 on the shroud underside in this case runs parallel to the conveying direction F, i.e., parallel to the axial direction A or the longitudinal direction of the outer ring 24. The axial distance dA is dimensioned to be greater than the radial distance dR, wherein the angle W of the connecting line V is approximately 30°.

Figure 13:
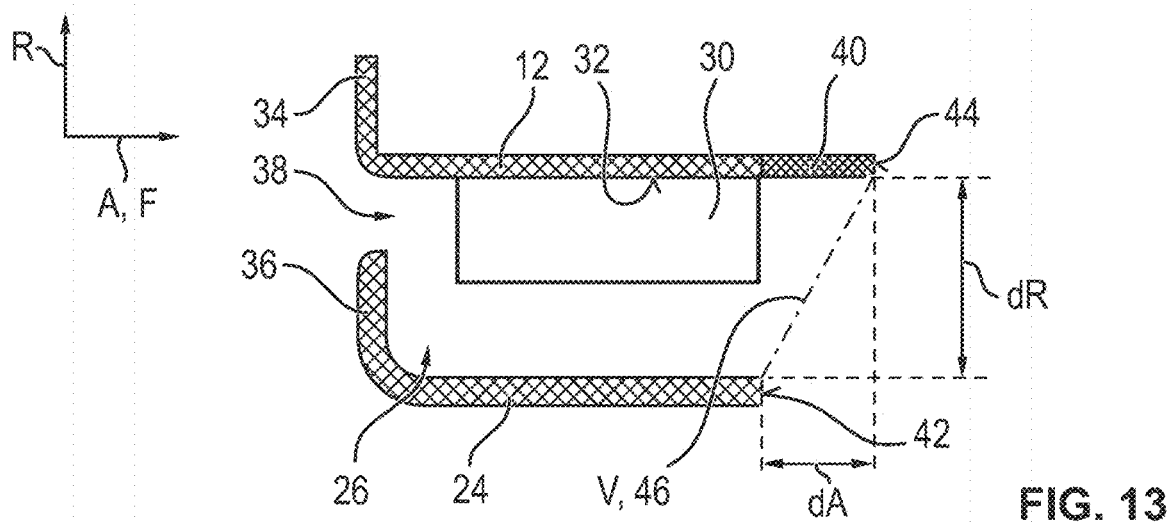

An exemplary embodiment of the gap geometry in which the shroud ring section 40 is oriented parallel to the conveying direction F is shown in FIG. 13. The radial distance dR in this case is dimensioned to be approximately double the size of the axial distance dA. The angle W of the connecting line V in this case is approximately 65°.

Figure 14:
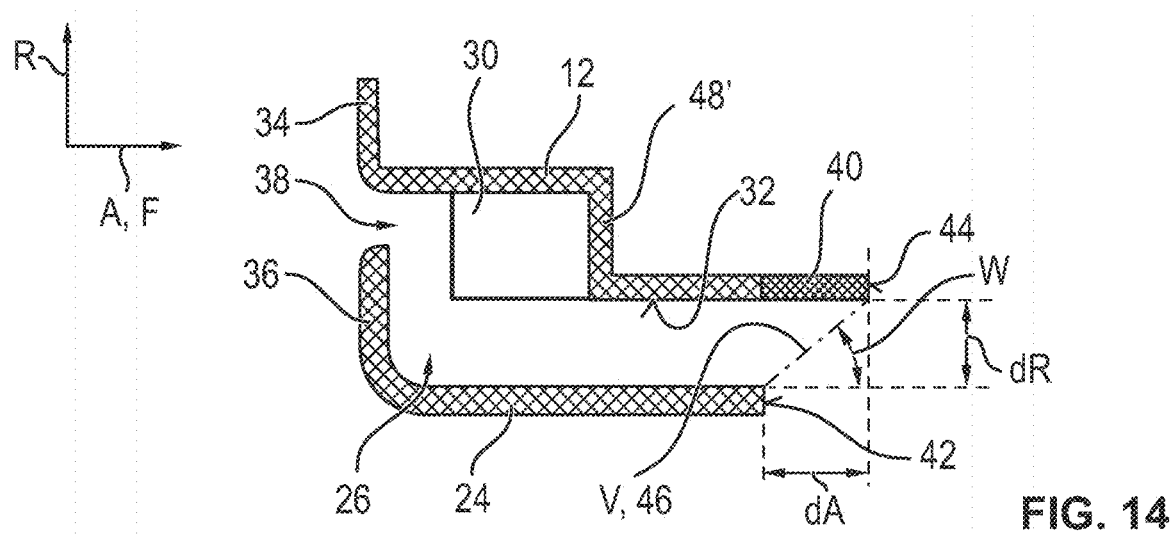

An embodiment of the gap geometry in which the radial stepped offset of the stepped contour 48' is arranged at approximately half the axial height of the outer ring 24 is shown in FIG. 14. The ribs 30 extend in this case from the stepped offset counter to the conveying direction F. The shroud ring section 40 is oriented parallel to the conveying direction F, wherein the radial distance dR is dimensioned to be less than the axial distance dA and wherein the angle W of the connecting line V is approximately 35°.

Figure 15:
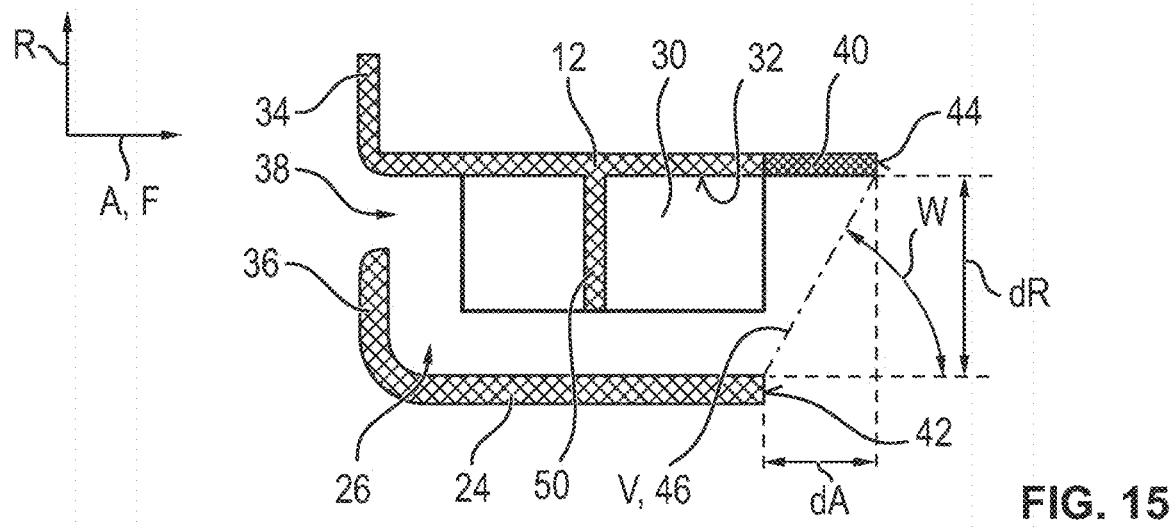

FIG. 15 shows an exemplary embodiment in which the shroud ring section 40 is configured parallel to the conveying direction F. The radial distance dR in this case, as in the exemplary embodiment of FIG. 13, is dimensioned to be approximately double the size of the axial distance dA. The angle W of the connecting line V in this case is approximately 65°. In this embodiment, the shroud ring 12 is provided with a circumferential contour 50. The contour 50, also denoted hereinafter as the radial lip, is configured in this case as a freestanding, radially running annular wall which is arranged approximately at half the axial height of the outer ring 24. Relative to the axial direction A or the conveying direction F the ribs 30 extend in this case above and below the radial lip 50.

While the exemplary embodiments have been described in the above description, it should be mentioned that a plurality of modifications is possible. In particular, such an embodiment of the fan shroud 6 according to the invention is also suitable for discharging waste heat from the components of a purely electrically operated vehicle. Moreover, it should be mentioned that the exemplary embodiments are merely examples which are not intended to limit the protected scope, the applications and the construction in any way. Rather, a guide for implementing at least one exemplary embodiment is provided to the person skilled in the art by the above description, wherein various modifications may be made, in particular regarding the function and arrangement of the described constituent parts, without departing from the protected scope as emerges from the claims and these equivalent combinations of features.

The following is a summary list of reference numerals and the corresponding structure used in the above description of the invention:

2 Cooling fan module
4 Cooling fan
6 Fan shroud
8 Fan wheel
10 Fan wheel recess
12 Shroud ring
14 Hub cup
16 Blade
16a Front edge
16b Rear edge
16c Blade tip
18 Motor holder
20 Strut
22 Motor electronics system
24 Outer ring
26 Ring gap
28 Rib structure
30 Rib
32 Inner circumference
34 Stepped offset
36 Radial rib
38 Gap opening
40 Shroud ring section
42 Outer ring end surface
44 Shroud ring end surface
46 Gap opening
48, 48' Contour/stepped contour
50 Contour/radial rib
R Radial direction
A Axial direction
F Conveying direction
O Shroud upper side
U Shroud underside
D Rotational direction
NW Angle of inclination
dA Spacing/axial distance
dR Spacing/radial distance
V Connecting line
W Angle

The invention claimed is:

1. A cooling fan, comprising
a fan shroud having a shroud upper side and having a shroud underside and being formed with a fan wheel recess which is surrounded by a shroud ring;
a fan wheel rotatably arranged in the fan wheel recess for conveying an air flow along a conveying direction from the shroud upper side to the shroud underside;
said fan wheel having a central hub cup, a plurality of radially oriented blades, and an outer ring connecting said blades to one another at blade tip ends thereof;
wherein a circumferential ring gap is formed between said outer ring and said shroud ring;
said shroud ring on the shroud underside extending axially beyond said outer ring with a shroud ring section;
said shroud ring section being oriented parallel or at an angle of inclination and radially inwards relative to the conveying direction, so that the shroud ring section engages radially behind said outer ring, at least in some sections thereof;
a connecting line being inclined at an acute angle relative to the conveying direction from a radially outermost edge of an outer ring end surface of said outer ring to a radially innermost edge of a shroud ring end surface of said shroud ring section;
a rib structure introduced into the ring gap in order to reduce swirl in a gap flow oriented against the conveying direction; and
said rib structure having a number of ribs which protrude into the ring gap at least in some sections and extend beyond an axial outer ring end surface of said outer ring toward said inclined shroud ring section.

2. The cooling fan according to claim 1, wherein said axially extending shroud ring section is formed without pockets.

3. The cooling fan according to claim 1, wherein said outer ring has a radial lip aligned flush with said ring gap in a region of said shroud upper side in the radial direction.

4. The cooling fan according to claim 1, wherein said rib structure is integrally formed in one piece on an inner circumference of said shroud ring facing said outer ring.

5. The cooling fan module, comprising:
a cooling fan according to claim 1;
an electric motor and radially oriented struts holding said motor in the fan wheel recess of the fan shroud.

* * * * *